(12) United States Patent
Fang et al.

(10) Patent No.: US 11,756,182 B2
(45) Date of Patent: Sep. 12, 2023

(54) PATTERN GROUPING METHOD BASED ON MACHINE LEARNING

(71) Applicant: ASML Netherlands B.V., Veldhoven (NL)

(72) Inventors: Wei Fang, Milpitas, CA (US); Zhaohui Guo, San Jose, CA (US); Ruoyu Zhu, San Jose, CA (US); Chuan Li, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 359 days.

(21) Appl. No.: 16/508,167

(22) Filed: Jul. 10, 2019

(65) Prior Publication Data

US 2020/0020092 A1 Jan. 16, 2020

Related U.S. Application Data

(60) Provisional application No. 62/697,898, filed on Jul. 13, 2018.

(51) Int. Cl.
*G06T 7/00* (2017.01)
*G06F 18/24* (2023.01)

(52) U.S. Cl.
CPC .............. *G06T 7/001* (2013.01); *G06F 18/24* (2023.01); *G06T 2207/20081* (2013.01); *G06T 2207/30148* (2013.01)

(58) Field of Classification Search
None
See application file for complete search history.

(56) References Cited

U.S. PATENT DOCUMENTS 10,204,290 B2 * 2/2019 Yong .................... G06T 7/0004
2007/0288219 A1 12/2007 Zafar et al.
2008/0075352 A1 3/2008 Shibuya et al.
(Continued)

FOREIGN PATENT DOCUMENTS

CN       107408209 A    11/2017
JP       2014195090 A   10/2014
(Continued)

OTHER PUBLICATIONS

International Search Report dated Oct. 22, 2019 for corresponding PCT International Application No. PCT/EP2019/068015 (4 pages).
(Continued)

*Primary Examiner* — Vikkram Bali
(74) *Attorney, Agent, or Firm* — Finnegan, Henderson, Farabow, Garrett & Dunner, LLP

(57) ABSTRACT

A pattern grouping method may include receiving an image of a first pattern, generating a first fixed-dimensional feature vector using trained model parameters applying to the received image, and assigning the first fixed-dimensional feature vector a first bucket ID. The method may further include creating a new bucket ID for the first fixed-dimensional feature vector in response to determining that the first pattern does not belong to one of a plurality of buckets corresponding to defect patterns, or mapping the first fixed-dimensional feature vector to the first bucket ID in response to determining that the first pattern belongs to one of a plurality of buckets corresponding to defect patterns.

18 Claims, 8 Drawing Sheets

(56) References Cited

U.S. PATENT DOCUMENTS

| | | | |
|---|---|---|---|
| 2008/0250384 A1* | 10/2008 | Duffy | G03F 7/7065 |
| | | | 716/55 |
| 2014/0301630 A1 | 10/2014 | Kulkarni et al. | |
| 2016/0163035 A1* | 6/2016 | Chang | G06T 7/0004 |
| | | | 382/149 |
| 2016/0313651 A1 | 10/2016 | Middlebrooks et al. | |
| 2018/0107903 A1 | 4/2018 | Yong | |
| 2019/0155164 A1* | 5/2019 | Chen | G03F 7/7065 |

FOREIGN PATENT DOCUMENTS

| | | |
|---|---|---|
| JP | 2017537312 A | 12/2017 |
| JP | 2018005639 A | 1/2018 |
| KR | 10-2013-0118822 A | 10/2013 |
| KR | 10-2017-0074932 A | 6/2017 |
| KR | 10-2018-0068292 A | 6/2018 |
| TW | 201713946 A | 4/2017 |
| TW | 201743143 A | 12/2017 |
| TW | 201822038 A | 6/2018 |
| WO | WO 2017/194281 A1 | 11/2017 |

OTHER PUBLICATIONS

Katsuyoshi Miura et al, "Fast and Accurate Design Based Binning Based on Hierarchical Clustering with Invariant Feature Vectors for BEOL" May 1, 2013 pp. 7-12. Abstract Section 1, paragraph 3; figure 1 section IILA; figure 3. Japan.

Office Action of the Intellectual Property Office of Taiwan issued in related Taiwanese Patent Application No. 108124602; dated Mar. 17, 2021 (19 pgs.).

Office Action of the Intellectual Property Office of Taiwan issued in related Taiwanese Patent Application No. 111101394; dated Dec. 13, 2022 (18 pgs.).

Notification of Reason(s) for Refusal issued in related Korean Patnet Application No. 10-2021-7001043; dated Apr. 3, 2023 (9 pgs.).

* cited by examiner

PATTERN GROUPING METHOD BASED ON MACHINE LEARNING

CROSS-REFERENCE TO RELATED APPLICATIONS

This application claims priority of U.S. application 62/697,898 which was filed on Jul. 13, 2018, and which is incorporated herein in its entirety by reference.

FIELD

The embodiments provided herein are related to a pattern grouping method, and more particularly, a pattern grouping method based on machine learning that may be useful for defect reviewing in semiconductor fabrication operation processes, among others.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) may be employed. As the physical sizes of IC components continue to shrink, accuracy and yield in defect detection become more and more important. However, imaging resolution and throughput of inspection tools struggles to keep pace with the ever decreasing feature size of IC components.

When technology nodes are reduced down to, for example, 10 nm, some inspection tools may generate a large amount of nuisance defects (i.e., false positives). For example, in some inspection systems, 90% of identified defects may turn out to be nuisance defects. Therefore, defect review becomes increasingly critical. Defect review that involves reconfirmation of previously identified defects or suspect locations on a wafer may be utilized.

To meet the demand of high throughput and high yield manufacturing processes, operators need to review a wafer, a chip, or a mask through a graphical user interface (GUI) displaying various patterns of objects under observation in a display portion of foundry equipment and to identify pattern defects at the earliest possible stage. Unfortunately, identifying pattern defects may take a substantial amount of an operator's time, thereby hurting throughput.

SUMMARY

In some embodiments of the disclosure, a grouping method is provided. The method may include receiving an image of a first pattern, generating a first fixed-dimensional feature vector using trained model parameters, and assigning the first fixed-dimensional feature vector a first bucket identity (ID). The model parameters may be based on the received image. For example, the model parameters may comprise data of feature patterns such as SEM image data of a detected defect or pattern data from a wafer design plan at a location corresponding to where a defect was detected. The method may be used for defect pattern grouping for semiconductor manufacturing processes.

A defect pattern may comprise an image of a wafer that includes features associated with one or more defects. Defect patterns may comprise various types of information, including scanned raw image data, processed images, imaged features identified in defect inspection, design patterns corresponding to imaged features, and so on.

Model parameters may be trained by, for example, obtaining a plurality of images of a plurality of patterns with assigned bucket IDs and training model parameters for a deep learning network. Training may further comprise applying parameters of a single polygon located in a center of one of a plurality of images.

DETAILED DESCRIPTION

Figure 1:
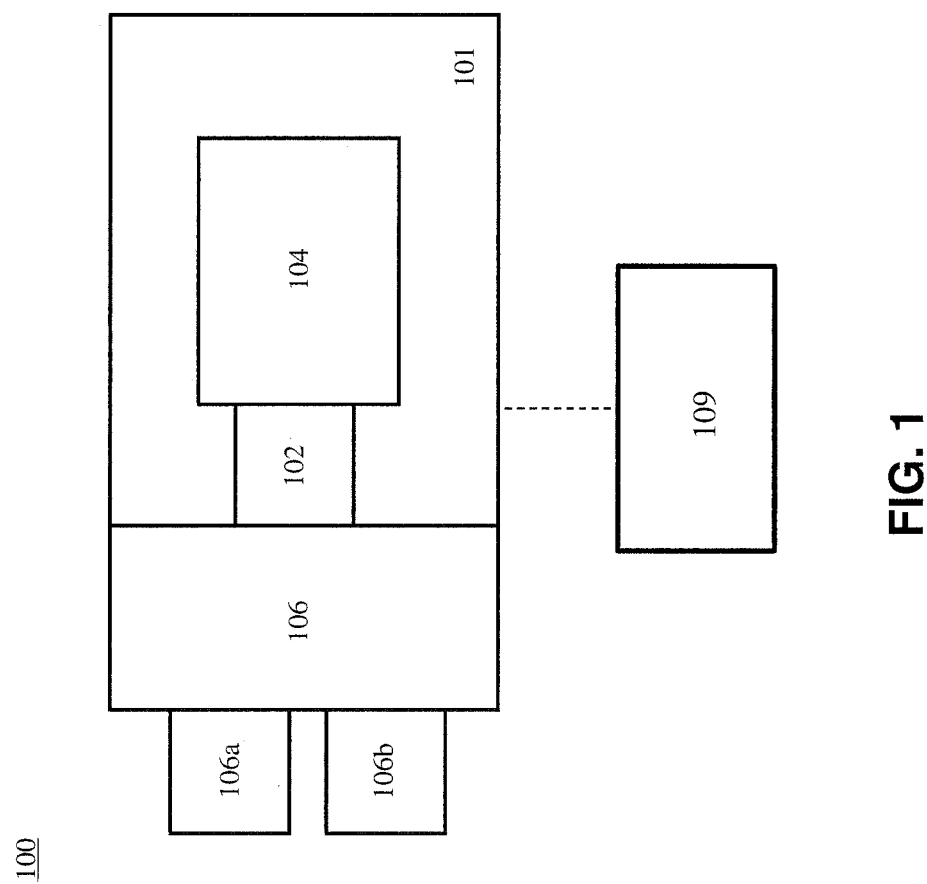
FIG. 1 is a schematic diagram illustrating an exemplary electron beam inspection (EBI) system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems, and methods consistent with aspects related to the subject matter as recited in the appended claims. For example, although some embodiments are described in the context of utilizing electron beams, the disclosure is not so limited. Other types of charged particle beams can be similarly applied. Furthermore, other imaging systems can be used, such as optical imaging, photo detection, x-ray detection, etc.

The enhanced computing power of electronic devices, while reducing the physical size of the devices, can be accomplished by significantly increasing the packing density of circuit components such as transistors, capacitors, diodes, etc. on an IC chip. For example, an IC chip of a smart phone, which is the size of a thumbnail, may include over 2 billion transistors, the size of each transistor being less than $1/1000$th of a human hair. Thus, it is not surprising that semiconductor IC manufacturing is a complex and time-consuming process, with hundreds of individual steps. Errors in even one step have the potential to dramatically affect the functioning of the final product. Even one "killer defect" can cause device failure. The goal of the manufacturing process is to improve the overall yield of the process. For example, for a 50-step process to get to a 75% yield, each individual step must have a yield greater than 99.4%, and if the individual step yield is 95%, the overall process yield drops to 7%.

While high process yield is desirable in an IC chip manufacturing facility, it is also essential to maintain a high wafer throughput, defined as the number of wafers processed per hour. High process yields and high wafer throughput can be impacted by the presence of defects, especially when there is operator intervention to review the defects. Thus, detection and identification of micro and nano-sized defects by inspection tools (such as a SEM) is essential for maintaining high yields and low cost.

In the enhanced imaging system described herein, defect identification and classification may be performed with improved throughput and accuracy. Processing may be enhanced by reducing reliance on operator intervention by, for example, eliminating the need for operators to determine similarity of extracted patterns and to sort them into known defect types. The enhanced imaging system may break the defects down into one or more features, each of the features corresponding to one or more attributes of the defect pattern. Using these features, the enhanced imaging system can provide an improved method for identifying and classifying defects. Patterns having slight deviations from recognized shapes may still be captured and accounted for by, for example, representing the presence of a particular feature with a degree of certainty. Such methods may achieve better accuracy, efficiency performance, and high speed in identifying and classifying defects.

Patterns may be processed by convolution, pooling, and subsampling so that individual feature attributes may be analyzed. Analysis of features may allow a feature vector to be generated. Feature vectors may be used for pattern grouping. Processing of patterns may not be strongly affected by slight deviations in orientation, scale, or occlusion so that similar patterns may still be grouped together. Furthermore, when a defect image includes features in addition to a center pattern, features of the defect pattern may be extracted. Furthermore, running a linear classifier may require less computing resources than a corresponding pattern similarity measurement method for pattern grouping.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

Additional objects and advantages of the disclosed embodiments will be set forth in part in the following description, and in part will be apparent from the description, or may be learned by practice of the embodiments. Objects and advantages of the disclosed embodiments may be realized and attained by the elements and combinations set forth in the disclosure. However, exemplary embodiments of the present disclosure are not necessarily required to achieve such exemplary objects and advantages, and some embodiments may not achieve any of the stated objects and advantages.

Reference is now made to FIG. 1, which illustrates an exemplary electron beam inspection (EBI) system 100 consistent with embodiments of the present disclosure. EBI system 100 may be used for imaging. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port 106a and a second loading port 106b. EFEM 106 may include additional loading port(s). First loading port 106a and second loading port 106b receive wafer front opening unified pods (FOUPs) that contain wafers (e.g., semiconductor wafers or wafers made of other material(s)) or samples to be inspected (wafers and samples may be collectively, referred to as "wafers" herein). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104. Electron beam tool 104 may be a single-beam system or a multi-beam system. A controller 109 is electronically connected to electron beam tool 104. Controller 109 may be a computer configured to execute various controls of EBI system 100. While controller 109 is shown in FIG. 1 as being outside of the structure that includes main chamber 101, load/lock chamber 102, and EFEM 106, it is, appreciated that controller 109 can part of the structure.

Figure 2:
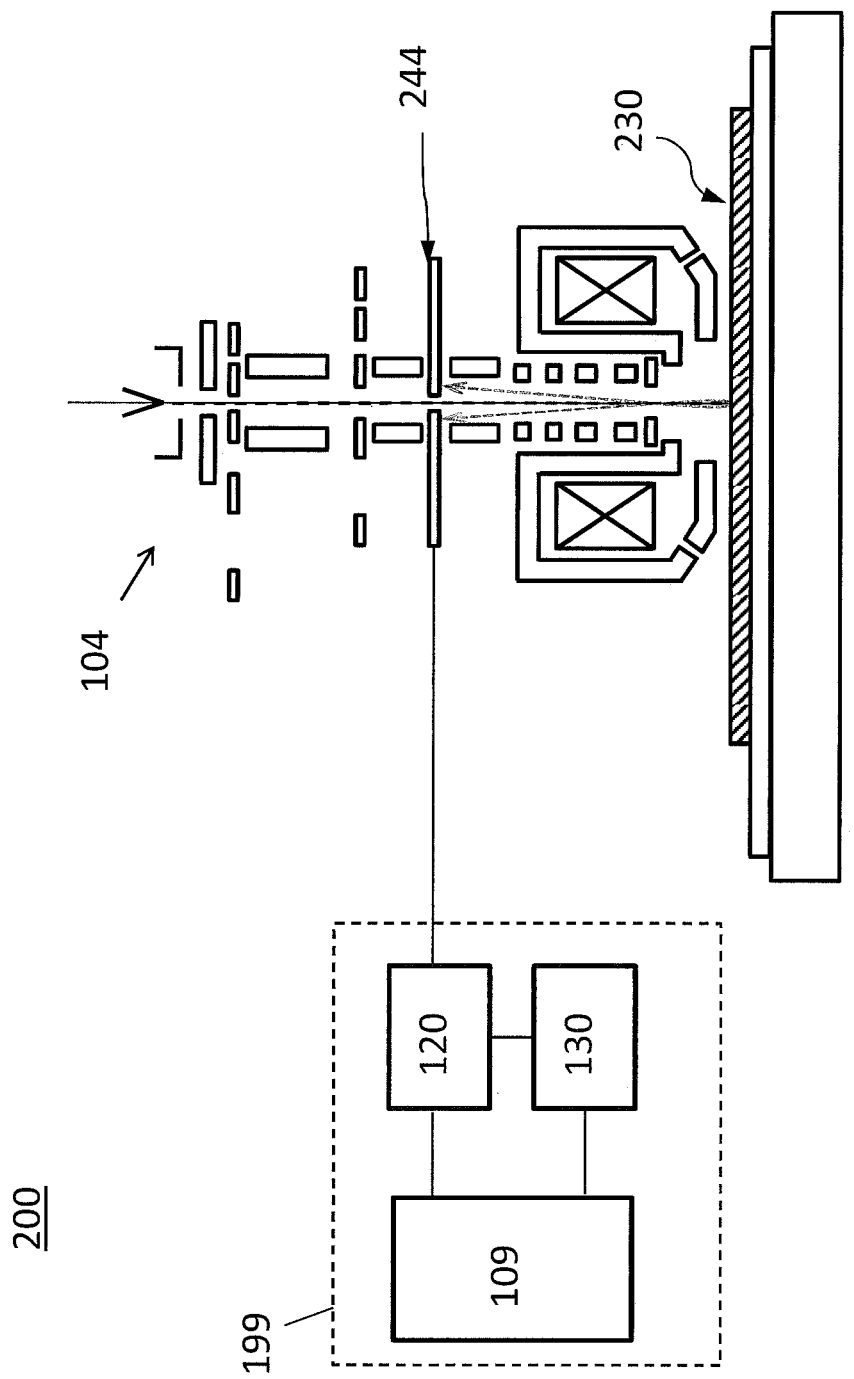
FIG. 2 is a schematic diagram illustrating an exemplary electron beam tool, consistent with embodiments of the present disclosure that can be a part of the exemplary electron beam inspection system of FIG. 1.

FIG. 2 illustrates an imaging system 200 according to embodiments of the present disclosure. Electron beam tool 104 of FIG. 2 may be configured for use in EBI system 100. Although FIG. 2 shows electron beam tool 104 as a single-beam inspection tool that may use only one primary electron beam to scan one location of a wafer 230 at a time, embodiments of the present disclosure are not so limited. For example, electron beam tool 104 may also be a multi-beam inspection tool that employs multiple primary electron beamlets to simultaneously scan multiple locations on wafer 230.

System 200 may be used for inspecting wafer 230 on a sample stage, and comprises an electron beam tool 104, as discussed above. System 200 also comprises an image processing system 199 that includes an image acquirer 120, storage 130, and controller 109. Image acquirer 120 may comprise one or more processors or circuitry, such as circuitry of the one or more processors or other circuitry. For example, image acquirer 120 may comprise a computer, server, mainframe host, terminals, personal computer, any kind of mobile computing devices, and the like, or a combination thereof. Image acquirer 120 may connect with a detector 244 of electron beam tool 104 through a medium such as an electrical conductor, optical fiber cable, portable storage media, infrared (IR), Bluetooth, internet, wireless network, wireless radio, or a combination thereof. Image acquirer 120 may receive a signal from detector 244 and may construct an image. Image acquirer 120 may thus acquire images of wafer 230. Image acquirer 120 may also perform various post-processing functions, such as generating contours, superimposing indicators on an acquired image, and the like. Image acquirer 120 may be configured to perform adjustments of brightness and contrast, etc. of acquired images. Storage 130 may be a storage medium such as a hard disk, cloud storage, random access memory (RAM), other types of computer readable memory, and the like. Storage 130 may be coupled with image acquirer 120 and may be used for saving scanned raw image data as original images, and post-processed images. Image acquirer 120 and storage 130 may be connected to controller 109. In some embodiments, image acquirer 120, storage 130, and controller 109 may be integrated together as one control unit.

In some embodiments, image acquirer 120 may acquire one or more images of a sample based on an imaging signal received from detector 244. An imaging signal may correspond to a scanning operation for conducting charged particle imaging. An acquired image may be a single scanned raw image comprising a plurality of imaging areas. The image may be stored in storage 130. The image may be an original image that may be divided into a plurality of regions. Each of the regions may comprise one imaging area containing a feature of wafer 230.

Figure 3:
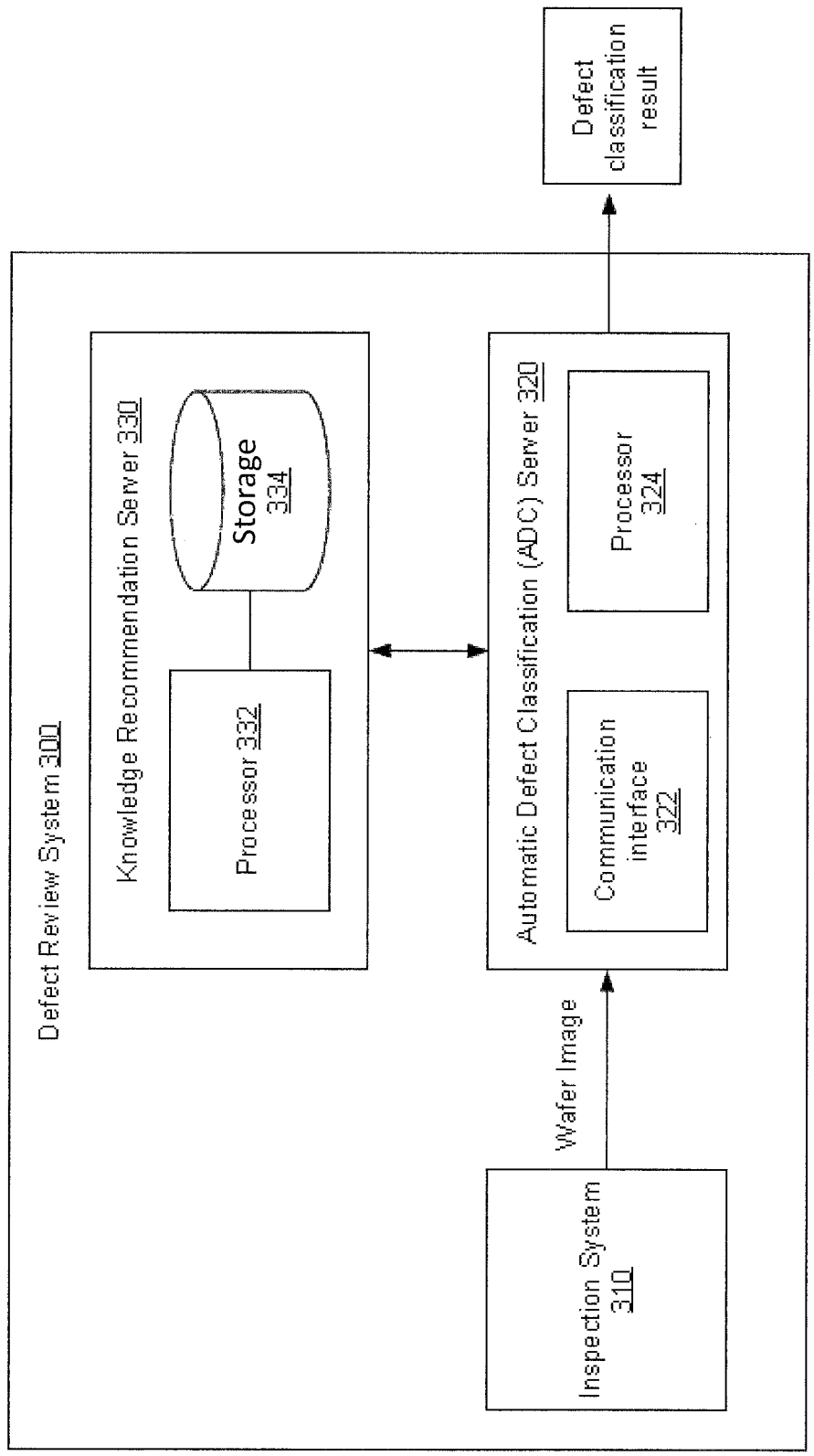
FIG. 3 is a block diagram illustrating an exemplary defect review system, consistent with embodiments of the present disclosure.

In some embodiments, a computer system may be provided that can identify defects in a wafer image and classify the defects into categories according to the defect type. For example, once a wafer image is acquired, it may be transmitted to the computer system for processing. FIG. 3 is a schematic diagram of a defect review system 300, consistent with embodiments of the present disclosure.

Referring to FIG. 3, defect review system 300 may include a wafer inspection system 310, an Automatic Defect Classification (ADC) server 320, and a knowledge recommendation server 330 electrically coupled to the ADC server 320. Wafer inspection system 310 may be EBI system 100 described with respect to FIG. 1. It is appreciated that ADC server 320 and knowledge recommendation server 330 can be part of or remote from EBI system 100.

Wafer inspection system 310 may be any inspection system that generates an inspection image of a wafer. The wafer may be a semiconductor wafer substrate, or a semiconductor wafer substrate having one or more epi-layers or process films, for example. Wafer inspection system 310 may be any currently available or developing wafer inspection system. The embodiments of the present disclosure do not limit the specific type for wafer inspection system 310. Such a system may generate a wafer image having a resolution so as to observe key features on the wafer (e.g., less than 20 nm).

ADC server 320 may include a communication interface 322 that is electrically coupled to the wafer inspection system 310 to receive the wafer image. ADC server 320 may also include a processor 324 that is configured to analyze the wafer image and detect and classify defects that appear on the wafer image, and may use a defect knowledge file in this analysis, detection, or classification. The defect knowledge file may be manually provided to ADC server 320 by an operator. Alternatively, according to some embodiments of the present disclosure, the defect knowledge file may be automatically provided to ADC server 320 by knowledge recommendation server 330.

For example, knowledge recommendation server 330 may be electrically coupled to the ADC server 320. Knowledge recommendation server 330 may include a processor 332 and a storage 334. Processor 332 may be configured to build a plurality of defect knowledge files and to store the plurality of defect knowledge files in storage 334. The plurality of defect knowledge files may contain information related to various types of defects generated during various stages of wafer manufacturing processes. The various stages of wafer manufacturing processes may include, but are not limited to, a lithography process, an etching process, a chemical mechanical polishing (CMP) process, or an interconnection forming process.

Processor 332 may be configured to build the plurality of defect knowledge files based on a plurality of defect patch images. The plurality of defect patch images may be generated by a wafer inspection tool, such as electron beam tool 104 illustrated in FIG. 2. A defect patch image may be a small image (e.g., 34×34 pixels) of a portion of the wafer that contains a defect. The defect patch image may be centered on the defect, and may include neighboring pixels of the defect.

Processor 332 may be trained, via a machine learning process, to build a knowledge file related to a specific type of defect based on a plurality of defect patch images of that type of defect. For example, processor 332 may be trained to build a knowledge file related to broken line defects generated in an interconnect forming process based on a plurality of defect patch images of broken line defects.

Processor 332 may also be configured to, in response to a request for knowledge recommendation from ADC server 320, search for a knowledge file that matches a wafer image included in the received request and provide the knowledge file to the ADC server 320.

Storage 334 may store an ADC data center that contains a plurality of defect knowledge files related to various types of defects generated during various stages of wafer manufacturing processes. The plurality of defect knowledge files in the ADC data center may be built by processor 332 of knowledge recommendation server 330. Alternatively, a portion of the defect knowledge files in storage 334 may be preset by a user or an external computer system, and may be preloaded into storage 334.

A defect knowledge file may include general information about a single type of defect. The general information may include patch images and feature parameters to be used for later classification (e.g., size, edge roughness, depth, height, etc.) of the single type of defect. Alternatively, according to some embodiments of the present disclosure, a defect knowledge file may include general information about a plurality of types of defects that are present in the same process layer of a wafer. The single process layer may be, for example, a substrate layer, an epitaxial layer, a thin film layer, a photoresist layer, an oxide layer, a metal interconnection layer, etc.

Figure 4:
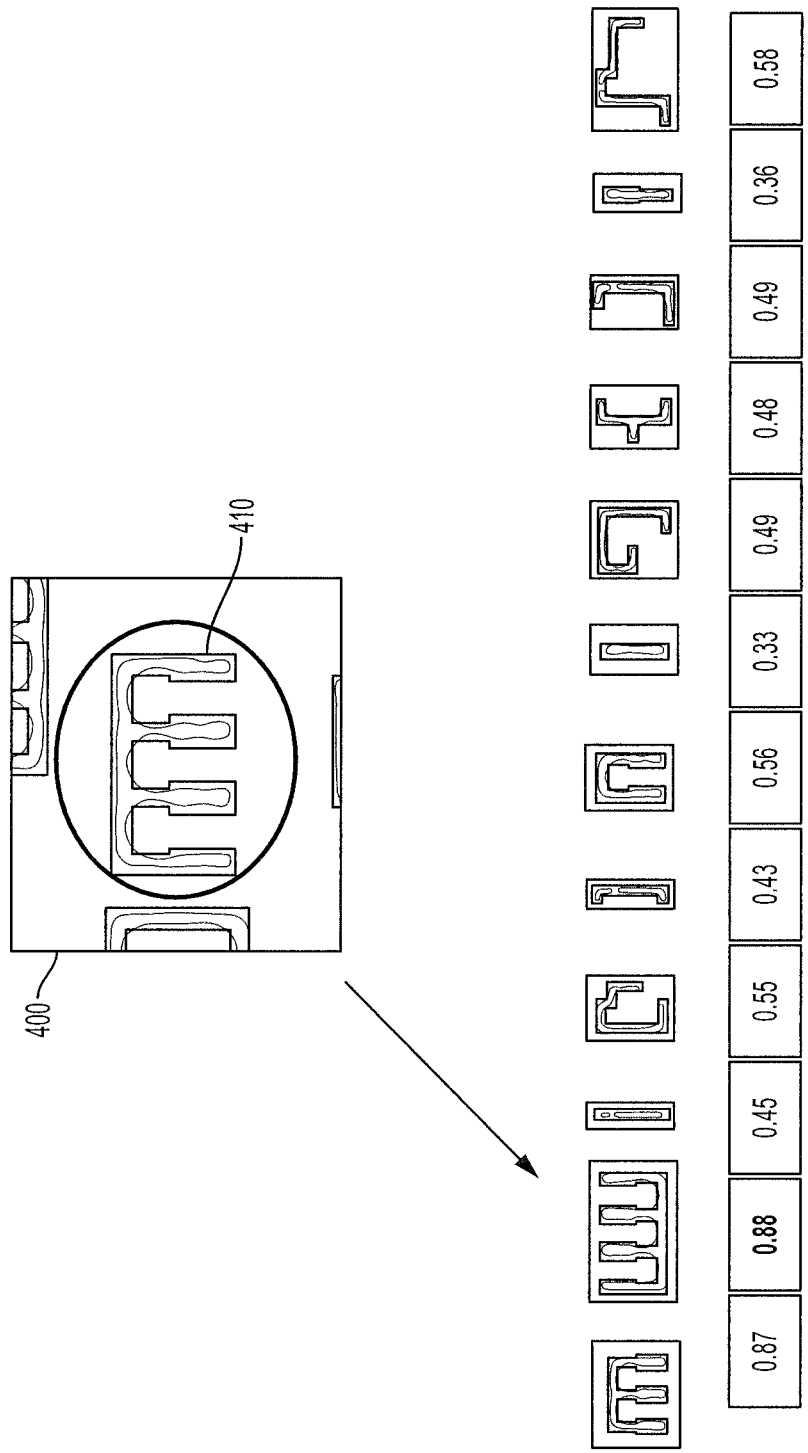
FIG. 4 is a schematic diagram illustrating an exemplary pattern similarity measurement method for pattern grouping.

Reference is now made to FIG. 4, which is a schematic diagram illustrating an aspect of an exemplary pattern similarity measurement method for pattern grouping. A pattern similarity measurement method may compare geometric features of an imaged defect pattern with a stored data pattern in a defect classification server to group a defect pattern into a group with the highest similarity.

Pattern data may be determined based on charged particle imaging. For example, a charged particle beam apparatus may be controlled to image a wafer. Imaging may comprise scanning the wafer to image at least a portion of the wafer. One or more scanned raw images of the imaging area may be obtained. Defect inspection may be performed on the scanned raw image. For example, one or more features on the wafer may be identified. The one or more features may comprise possible defects, critical areas, hot spots, other regions of interest, and the like. Further processing may be performed including image processing, defect mapping, providing a list of locations on the wafer corresponding to the identified possible defects, and so on. In some embodiments, defect review may be performed. Defect review may comprise imaging the areas identified in the defect inspection step to analyze the identified possible defects in greater detail, for example, at greater resolution. In some embodiments, defect review may comprise analyzing the scanned raw image using, for example, a technique different from that used in the defect inspection step, or a technique with a different set of parameters. Techniques for defect review may comprise, for example, using image processing algorithms.

Pattern data may be determined corresponding to the identified defects. Pattern data may be extracted from a wafer design plan based on location information gathered during defect inspection. A design plan of the wafer may be stored in advance. For example, the wafer design plan may be a graphical representation of the features on the wafer surface. The wafer design plan may be based on a pattern layout for constructing the wafer. The wafer design plan may correspond to a mask used to fabricate the wafer, for example. The wafer design plan may be stored in a database. Individual features may be extracted corresponding to the identified defects. For example, based on x-y coordinates of the defect locations identified during defect inspection, pattern data comprising geometric information of original feature designs may be gathered. Each identified defect may have a corresponding original feature design.

Pattern data may be extracted by superimposing an outline of a feature in the scanned raw image of the wafer. An image processing technique may be applied to generate a polygon corresponding to an imaged feature. Pattern data may also be extracted by superimposing an outline of a feature in a graphical representation of the wafer, such as the wafer design plan.

In a pattern grouping system adopting pattern similarity measurement method, an imaged pattern may be processed to extract geometric features of the defect pattern. Such geometric features may include number of sides, number of angles, dimension, shape, or the combination of any features thereof. Pattern data, such as Graphic Data System (GDS) information may be derived from these geometric features and represented by one or more polygons lineated in solid lines, for example as overlaid on an imaged pattern as shown in FIG. 4. The pattern grouping system may have a defect classification server with knowledge files storing defect pattern GDS information. The pattern grouping system may proceed to compare the GDS information of the extracted geometric features of the defect pattern with the defect pattern GDS information stored in the defect classification server representing multiple defect patterns.

Each comparison between the GDS information of the extracted geometric features of the defect pattern and the defect pattern GDS information of one of the multiple defect patterns stored in the defect classification server may lead to a value of a similarity parameter. The value of the similarity parameter may depend on the similarity of geometric features between the defect patterns under comparison. In some embodiments, the higher the value is, the more similarity the received defect pattern and the stored defect pattern share, and the higher possibility the received defect pattern belongs to the stored defect pattern group. For example, polygon 410 in pattern image 400 may be compared with 12 defect patterns as shown in FIG. 4, one by one. Each comparison may return a value of similarity which is larger than 0 and smaller or equal to 1, with 0 meaning no similarity and 1 meaning identical. After the completion of 12 comparisons, it may be determined that the defect pattern associated with the comparison returning the highest value is the pattern group the received defect pattern belongs to.

A method based on pattern similarity measurement may have drawbacks. Due to several limitations, the performance of techniques based on a similarity parameter may be suboptimal. For example, one limitation may be the heavy reliance on the definition of similarity whose value is based on calculation of the geometric difference of attributes of GDS polygon patterns. Even slight changes in a pattern attribute or polygon deformation may result in a significantly different result. Therefore, the calculated value of similarity may depend heavily on the setting up of pattern attributes that, to a certain extent, may rely on empirical decisions. Additionally, similar patterns having different orientation, scale, or occlusion (partial pattern appearance), may not be grouped into the same pattern grouping. Also, when a defect image has a center pattern surrounded by other patterns or pattern patches, or includes a combination of multiple GDS patterns, the defect pattern may not be correctly grouped. Further, the running complexity of pattern similarity measurement methods for pattern grouping may be relatively high. For example, run time complexity may be approximated by $O(N2)$, where O is function order and N is input size, which may be measured in hits.

Figure 5:
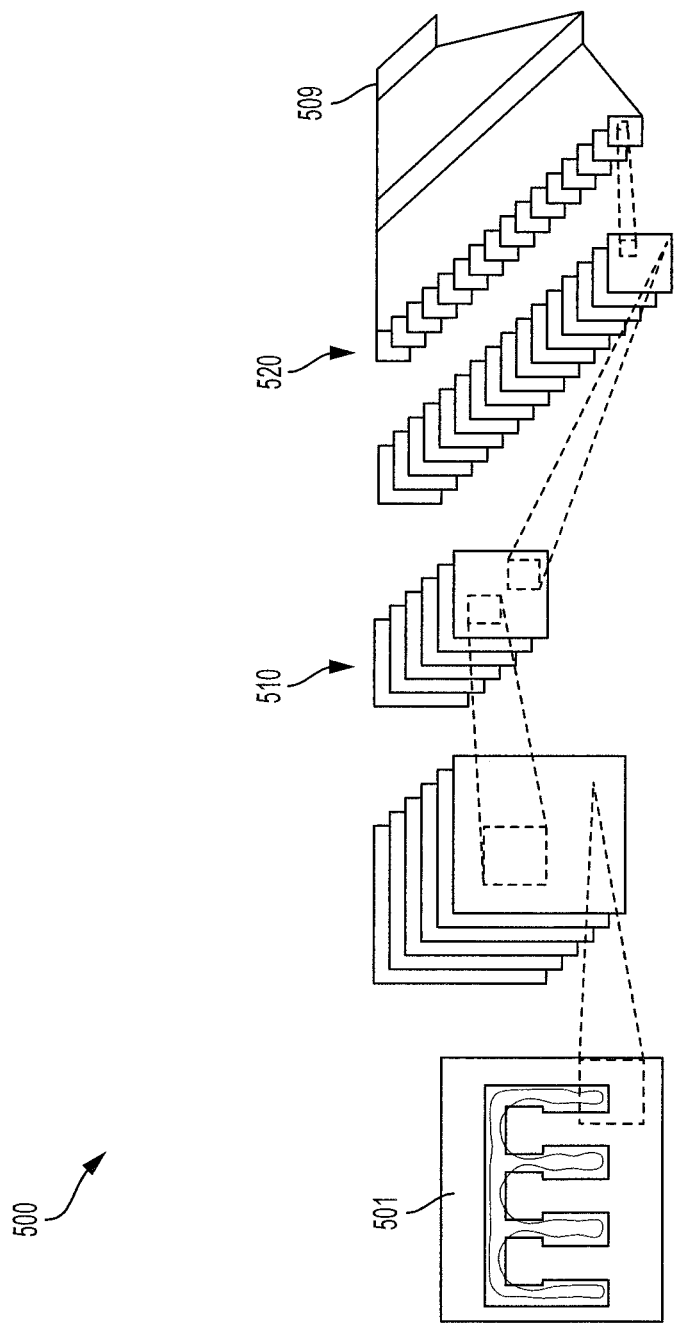
FIG. 5 is a schematic diagram illustrating exemplary feature extraction architecture for pattern grouping based on machine learning, consistent with embodiments of the present disclosure.

Reference is now made to FIG. 5, which is a schematic diagram illustrating exemplary feature extraction architecture for pattern grouping based on machine learning, consistent with embodiments of the present disclosure. The feature extraction architecture may comprise a convolutional neural network 500. In some embodiments, other forms of classification and pattern recognition may be employed. For example, cluster analysis, object detection, and masking may be employed. Other kinds of supervised learning systems based on machine learning may similarly be applied. The feature extraction architecture for pattern grouping based on machine learning may be pre-trained before generating pattern features.

In some embodiments, a linear classifier network of deep learning architecture may be adopted as a starting point to train and build feature extraction architecture for pattern grouping. A large amount of GDS pattern images may have been collected and may make up a large dataset of existing defect patterns. These GDS pattern images may be adjusted to reflect centering pattern group labels. Values of model parameters in each layer of the linear classifier network of deep learning architecture may be learned from the large dataset of existing defect patterns reflecting centering pattern groups. Because of the existence of the large amount of GDS pattern data, in each layer of the linear classifier network, data of the pattern image may be labelled automatically by the pattern grouping system instead of manual labeling. Each label in each layer may represent an attribute of a central polygon of a defect pattern. Utilizing GDS information, the training of the linear classifier network of deep learning architecture may be automatically completed with little manual input.

A machine learning model may be used that may include a deep neural network topology with multiple layers. Architecture of such a network may comprise input, first convolution, first pooling, second convolution, second pooling, one or more hidden layers, activation, and output, for example. An input 501 to network 500 may comprise a pattern image including an identified defect. An output 509 of network 500 may comprise a feature vector.

Depending on the nature of features of defect patterns, each layer of the architecture may have different numbers of sub samples generated. For example, as shown in FIG. 5, after the first convolution operation, there may be less than ten sub samples generated in first pool 510. While after the second convolution operation, the second layer may have more than ten sub samples generated in second pool 520. In some embodiments, variation between layers may be introduced by the complexity of geometric features of defect patterns. Defect patterns having more geometric information may have higher probability to generate more sub samples. For example, a complex defect pattern may exhibit various sub-shapes that may be broken up and analyzed as individual attributes.

After the model parameters have been determined from the training by large amount of GDS pattern images, the trained linear classifier network of deep learning architecture may process new pattern images in a feature-generation step. In this feature-generation step, pattern images with GDS data may pass through multiple layers of the trained network with the determined model parameters, to generate a fixed-dimensional feature vector at the end of the architecture. At each layer of convolution computing, GDS data of a pattern image may be analyzed for the architecture to determine if a pattern attribute exists, and if so, its geometric location. Each received pattern image with GDS data may be processed by calculations in a plurality of layers, layer by layer. Thus, a vector representation of an input image may be generated by the trained linear classifier network.

Figure 6:
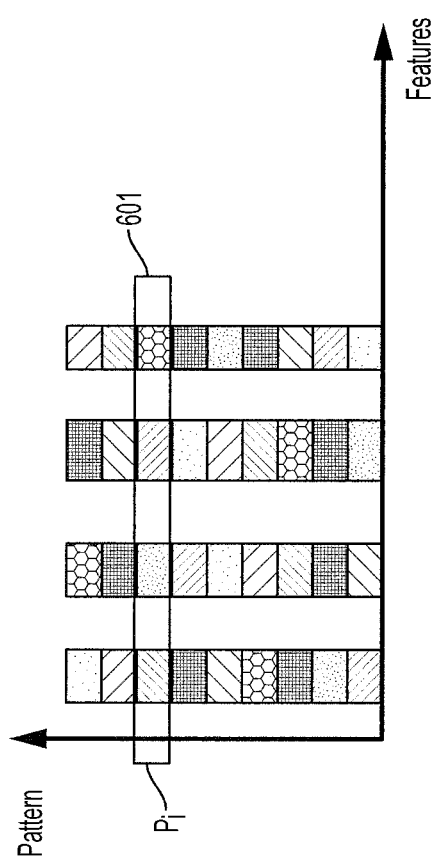
FIG. 6 is a schematic diagram illustrating an exemplary fixed-dimensional feature vectors from pattern images processed by feature extraction architecture based on machine-learning of FIG. 5, consistent with embodiments of the present disclosure.

Reference is now made to FIG. 6, which is a schematic diagram illustrating a graphical representation of exemplary fixed-dimensional feature vectors from pattern images processed by feature extraction architecture based on the machine-learning network of FIG. 5, consistent with embodiments of the present disclosure. A feature vector may comprise a plurality of values that represent magnitude, intensity, certainty, etc. of each of a plurality of features. For example, for a plurality of features, a pattern image may be evaluated to determine a degree of certainty of whether an attribute of a defect is present. In FIG. 6, the X-axis comprises four features. One feature may correspond to, for example, a line-to-line disconnect. The certainty that the feature is present in a pattern may be represented by a numerical value. The certainty may also be represented by various forms of graphical display, such as color, fill pattern, or varying degrees of shading. For example, as shown in FIG. 6, a plurality of patterns may be evaluated to determine the certainty, represented in fill pattern, that each of a particular feature is present.

After a pattern image is processed by the operations of the various layers of the network, a quantitative analysis may be performed by dividing each dimension of a feature vector into a few limited numbers of buckets. A bucket may comprise homogeneous members that have been distinguished and classified based on certain criteria. For example, a bucket may correspond to a category of defect. Training of the network may comprise categorizing GDS pattern data into the plurality of buckets using a training set of data. Training may proceed until a certain level of convergence is reached.

Each feature vector may be mapped into a bucket identity (ID). Convolution computing results may be converted into a fixed-dimensional vector representing a pattern feature. The fixed-dimensional feature vector, e.g., a one-dimensional vector, may function as a bucket ID. For example, in FIG. 6, along the X-axis, each vertical bar may represent one feature pattern. Each vertical bar may be a one-dimensional vector. Each vertical bar may include multiple values along the Y-axis, for example, with different values represented by different codes. Codes may be represented by fill pattern, for example. A feature vector may be output for a particular input pattern (Pi), and may be converted into a bucket ID 601. Because of the different values or different combinations of values, each feature vector may be unique and may represent a unique defect pattern group. Because similar pattern images share similar feature distributions, similar feature distributions may map into the same bucket ID. Therefore, feature vectors with the same combination of buckets of values may be determined to belong to the same pattern group. In some embodiments, it may be determined that patterns having a feature vector that does not fall into any bucket are nuisance defects.

While a one-dimensional vector has been discussed, it will be appreciated that a vector having multiple dimensions may be similarly applied. For example, in addition to presence or absence of a feature, other characteristics, such as location of the feature and its orientation, may be included and represented by values in a multi-dimension vector. Thus, various attributes of defect pattern features may be captured and vectorized.

The method of grouping GDS information of pattern images may achieve various advantages, such as better accuracy, efficiency performance, and high speed. Defect patterns may be decomposed into vectors that have a plurality of features, each of the features corresponding to one or more attributes of the defect pattern. Thus, rather than comparing whole patterns, a classification network may utilize individual features. Accordingly, slight deviations from recognized patterns may still be captured and accounted for by, for example, representing the presence of a particular feature with a degree of certainty.

Figure 7:
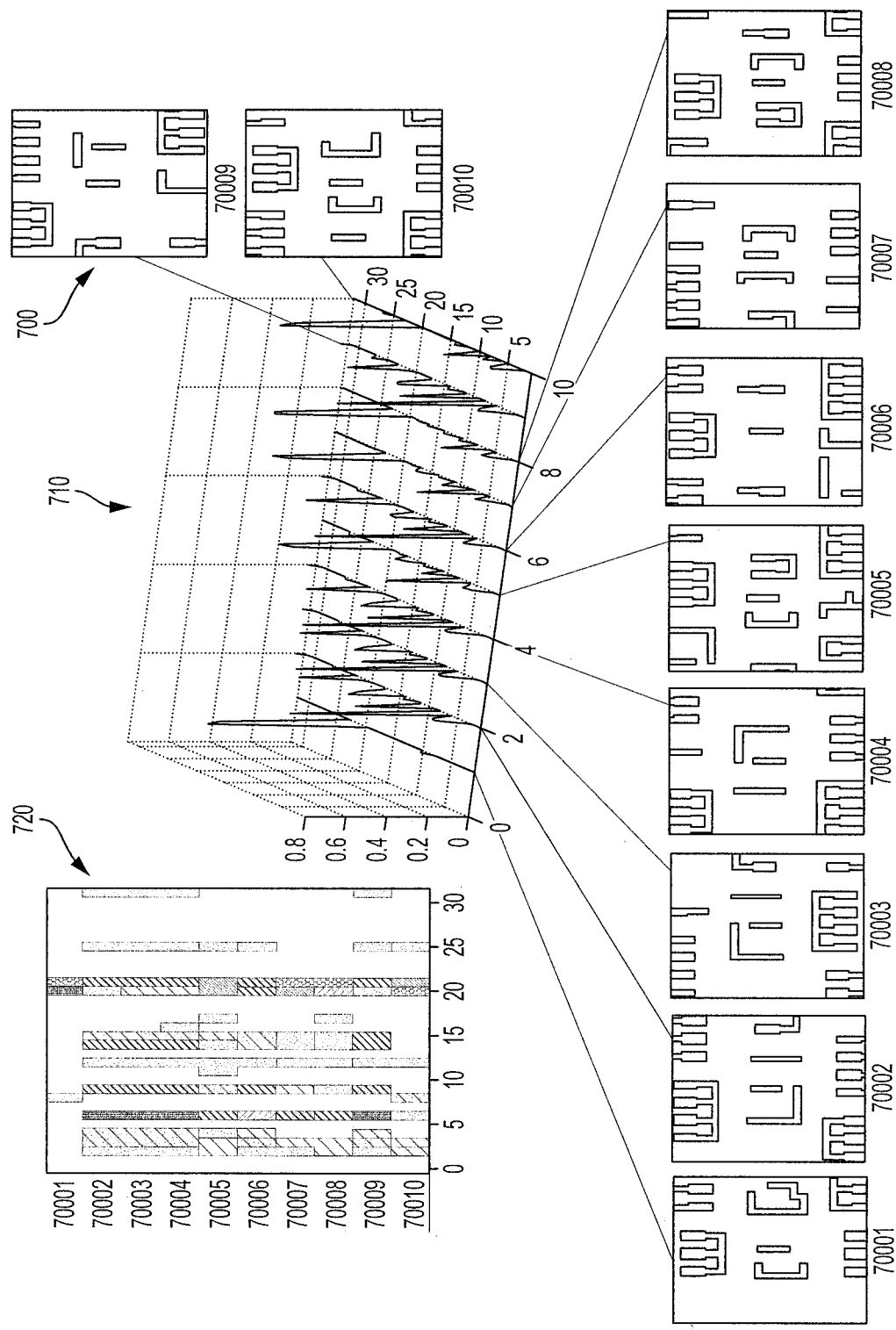
FIG. 7 is a schematic diagram illustrating an exemplary correlation of fixed-dimensional feature vectors, 3D representations of pattern groupings, and GDS information of defect pattern images, consistent with embodiments of the present disclosure.

Reference is now made to FIG. 7, which is a schematic diagram illustrating an exemplary correlation of fixed-dimensional feature vectors, 3D representations of pattern groupings, and GDS information of defect pattern images, consistent with embodiments of the present disclosure.

As shown in FIG. 7, extracted GDS information of defect pattern images 700 may be provided. Pattern images 700 may comprise patterns 70001, 70002, 70003 . . . 70010. Pattern images 700 may be represented in black and white with multiple polygons representing various defects. In some embodiments, pattern images may be represented in color. A graph 710 may be generated that graphically represents a plurality of feature vectors generated from pattern images 700. The lines representing the feature vectors may be displayed in a plurality of colors. The feature vectors may be used for pattern grouping.

One or more defects may be identified in, for example, a defect inspection operation. In some embodiments, defect inspection may comprise identifying a plurality of defect candidates and distinguishing real defects from nuisance defects among the defect candidates. Pattern data may be extracted corresponding to the defects or defect candidates. The pattern data may comprise portions of scanned raw images corresponding to the imaged features identified in defect inspection, design patterns corresponding thereto, and so on. There may be a plurality of two-dimensional images of a predetermined window size that are analyzed. In some embodiments, the GDS information of defect pattern images may have been processed to represent an attribute of a central polygon of a defect pattern. In some other embodiments, the GDS information of defect pattern images may have not been processed as such and represent attributes of the central polygon and peripheral polygons of defect pattern images. There may be multiple defects, including defects of different types and at different locations on a sample. In the example of FIG. 7, ten separate defects are shown.

The feature extraction architecture may be built and trained to extract a plurality of features indicative of defects. For example, in FIG. 7, defect pattern grouping may be performed based on 32 features of image patterns. It is appreciated that the number of features to be extracted from different pattern images may be different. The features may be determined based on training data. To map into the feature extraction architecture, the number of layers of convolution and pooling may be different. In fixed-dimensional feature vectors 720, there are 32 features along the horizontal axis (X-axis) to represent the ten defect patterns shown in defect pattern images 700 along the vertical axis (Y-axis). In the X-Y plane, different codes may be used to represent different values of features. For example, in the illustration in FIG. 7, a denser fill pattern may represent presence of a feature (or high certainty of presence of a feature) and a lighter fill pattern may represent absence of a feature (or high certainty of absence of a feature).

Taking defect pattern 70010 as an example, the pattern has 32 values for the 32 features along X-axis, where the 32 values are represented by similar or different fill patterns. However, similar fill patterns for different features can be used to represent different values or value ranges. For example, both feature 5 and feature 10 of defect pattern 70010 have a dense fill pattern, but they may represent significantly different values or value ranges of the corresponding features, or they may represent similar values or value ranges of the corresponding features.

Taking feature 20 as an example, the feature has ten coded blocks along the Y-axis, where each of the ten coded blocks may represent the value or value range of the defect pattern that the coded block is associated with. However, different defect patterns may have different or similar values or value ranges of a feature. It is appreciated that a value or value range of a single feature may not be used to identify a defect pattern, but a combination or sequence of values or value ranges of all features may be used in the architecture to identify a defect pattern. Such combination or sequence of values or value ranges of all features may be a fixed-dimensional vector, e.g., one-dimensional (1D) vector that may be used as a bucket D.

Three-dimensional (3D) representations of pattern groupings 710 in FIG. 7 may be used to intuitively demonstrate the idea of a 1D vector bucket ID with combination or sequence of values or value ranges of a feature representing a defect pattern. Each wave line may be used to reflect a defect pattern. For example, a feature vector may be represented by a polynomial function having a degree equal to the number of features. There are multiple (e.g., 32) features of each wave line. Thus, a polynomial with an appropriate number of degrees may be used to represent the wave line. Values or value ranges of each of these 32 features may be normalized as shown in FIG. 7, in which all values are normalized into a range of zero to one. Different defect patterns may have similar or different values or value ranges of a feature. The combination or sequence of values or value ranges of all features may be used for identifying and differentiating a defect pattern from others.

Figure 8:
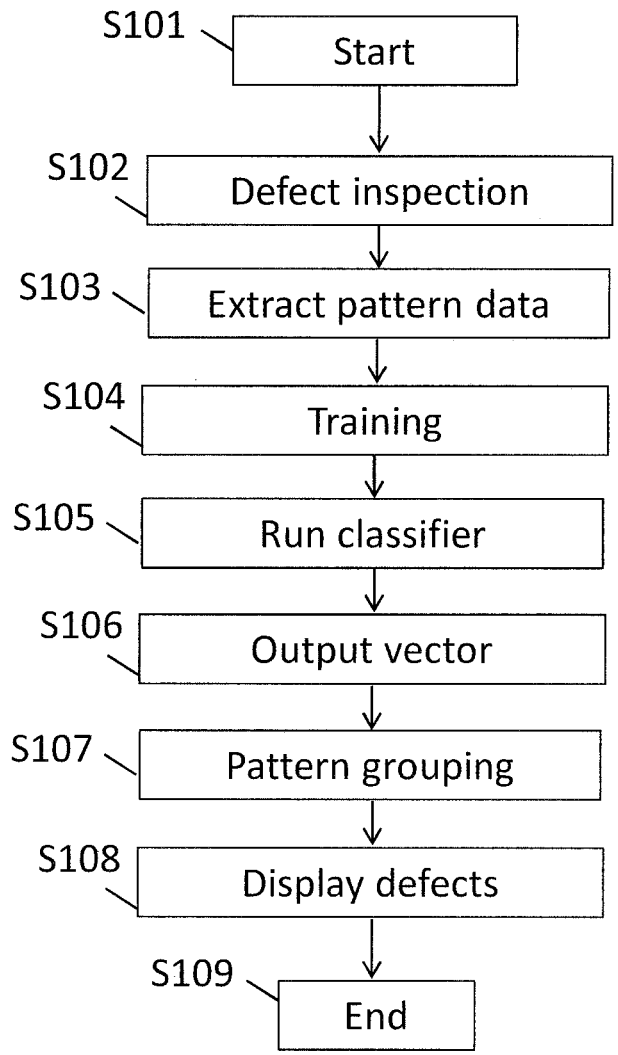
FIG. 8 is a flowchart representing an exemplary method, consistent with embodiments of the present disclosure.

Reference is now made to FIG. 8, which illustrates a flowchart of an exemplary determination method, consistent with embodiments of the present disclosure. A controller may be programmed to implement one or more blocks of the flowchart of FIG. 8. The controller may be coupled with a charged particle beam apparatus. The controller may control operations of the charged particle beam apparatus. The controller may be configured to receive information gathered from a detector of the charged particle beam apparatus and may be configured to perform processing functions. For example, controller 109 may be configured to execute a whole or a part of the method of FIG. 8.

In a step S101, the method may begin. Charged particle imaging may be performed to acquire images of a wafer. Imaging may comprise scanning the wafer to image the wafer, which may include scanning a portion of the wafer or the entire wafer. One or more scanned raw images of an imaging area may be obtained and stored. In a step S102, defect inspection may be performed on an acquired image. In step S102, features on the wafer may be identified. The features may comprise defects or possible defects. Defect inspection may comprise performing image analysis on an acquired image of the wafer surface using an image processing technique. Identification of defects may include determining a location on the wafer. Step S102 may include wafer mapping. In some embodiments, defect review or other forms of confirmation may be performed subsequent to initial defect identification.

In a step S103, pattern data may be determined corresponding to the identified defects. The pattern data may be extracted from a wafer design plan based on location information gathered in step S102. The wafer design plan may be stored in advance. The wafer design plan, may be based on a GDS representation of the wafer. Thus, the extracted pattern data may be GDS information.

In a step S104, training may be performed. In some embodiments, pre-training occurs prior to or after S102, or prior to or after S103, among others. During pre-training, one or more random or selected regions of GDS data can be "cut out" and can be used for pre-training. "Cut out" means that all the GDS data at all levels of hierarchy within the selected region are identified and merged into a GDS cell that includes all data of this "cut out" region, and no data from outside this "cut out" region. A location of this cut out region is identified, such as the central point, and this location or the cut out region is automatically labeled or otherwise identified with the shape type of this region. Examples of shape types include contacts, vias, lines, line corners, etc. These cut out regions of GDS along with the labels are used to pre-train a linear classifier network.

Training can also occur at S104, and may utilize the pre-trained linear classifier network discussed above. The training of S104 may comprise retrieving pattern data for a plurality of defects and categorizing the patterns into a plurality of buckets. The buckets may correspond to known defects. The training set of data may be stored in advance. In some embodiments, data obtained from step S103 may be added to the training set of data, or solely the data from step S103 may be used to perform training. Training may proceed until a certain level of convergence is reached. In such a manner, a classifier network may be built. The classifier network may be a linear classifier. Parameters of the classifier network may be determined based on the training. For example, a plurality of vectors corresponding to features associated with known defects may be determined.

In a step S105, classification may be performed. Classification may comprise running the classifier network built in previous steps on new data, such as by utilizing the pre-trained linear classifier network discussed above, or by utilizing the classified network of S104. For example, new patterns obtained in step S103 may be input to the classifier network. The input pattern may be a defect pattern image that may be passed through a plurality of layers of the classifier network. This may comprise convolution, subsampling, pooling, etc. Upon running of the classifier, an output of a feature vector may be obtained, as in a step S106. In step S106, a feature vector representing the input pattern may be generated.

In a step S107, pattern grouping may be performed. Pattern grouping may comprise classifying defects into a plurality of categories. The categories may be defect types, such as particles, pits, scratches, crystal defects, haze, void, and thinning, for example. In some embodiments, the categories may be specific to certain geometries. For example, a category may be a four-fingered terminal type defect. Furthermore, in some embodiments, categories are not limited to geometries. Features may be single- or multi-array vectors. Determining a group to which a pattern belongs may be based on the feature vector generated for each pattern. For example, a pattern may be assigned to a group based on a bucket ID that may be based on the feature vector. The feature vector of the pattern may be converted into a bucket ID.

A plurality of bucket IDs may be stored in a database. If a bucket ID of a new pattern corresponds to a bucket ID existing in the database, the pattern may be associated with a defect type and grouped accordingly. In some embodiments, if a bucket ID of an imaged pattern does not exist in the database, a new group may be formed. Thus, it may be determined that the pattern does not belong to any existing groups and a new defect group is created corresponding to the pattern's bucket ID. The bucket ID may be added to a database of bucket IDs corresponding to defects.

Pattern grouping may comprise comparing a plurality of input patterns to one another. For example, two or more patterns may be determined to have the same bucket ID. In response, the two or more patterns may be assigned to a group. The newly created group may correspond to a defect. The bucket ID of the two or more patterns may be added to a database of bucket IDs corresponding to defects. Furthermore, in some embodiments, when a plurality of patterns is input, if all of the patterns are grouped into the same bucket, a flag may be generated. Additionally, if all patterns are found to have different bucket IDs, a flag may be generated. In response to a flag being generated, an indication may be displayed to a user, or further processing may be performed, such as re-sampling the plurality of patterns.

In some embodiments, pattern grouping may comprise determining that a pattern corresponds to a nuisance defect if that pattern's feature vector does not correspond to any predetermined vectors associated with real defects. For example, if a pattern's bucket ID does not match any bucket ID associated with defects, that pattern may be disregarded as a nuisance defect.

Pattern grouping may also comprise grouping patterns into main groups and sub-groups. In some embodiments, a bucket may correspond to a sub-feature of a defect. A pattern may be grouped into a plurality of buckets corresponding to sub-features. Then, further grouping may be performed based on the sub-features. For example, it may be determined that a pattern having a Certain combination of sub-features may correspond to a bucket of a main group. Because similar pattern images may share similar feature distributions, it may be useful to determine feature distributions based on a plurality of buckets.

In a step S108, data may be displayed to a user. Data display may comprise displaying defects in an organized manner on the basis of the results of pattern grouping. For example, a wafer may be displayed with all defects of a certain type belonging to the same pattern group, while other defects are suppressed. Organized display based on pattern grouping may be useful in, for example, identifying systematic defects.

In a step S109, the process may end. Thereafter, further processing may be performed. Furthermore, the process may return to S101 and repeat with the same or different imaging conditions.

In some embodiments, a detector may communicate with a controller that controls a charged particle beam system. The controller may instruct components of the charged particle beam system to perform various functions, such as controlling a charged particle source to generate a charged particle beam and controlling a deflector to scan the charged particle beam over a sample. The controller may also perform post-processing functions, brightness/contrast adjustment, image subdivision, image processing, generating contours, superimposing indicators on an acquired image, and the like. The controller may combine functions of, for example, image acquirer 120 and controller 109. Additionally, the controller may comprise a storage such as storage 130. A non-transitory computer readable medium may be provided that stores instructions for a processor of controller 109 to carry out charged particle beam inspection, running a classifier network, performing pattern grouping, or other functions and methods consistent with the present disclosure. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The embodiments may further be described using the following clauses.

1. A method for group mapping, comprising:
   receiving an image of a first pattern;
   generating a first fixed-dimensional feature vector using trained model parameters, the model parameters being based on the received image; and
   assigning the first fixed-dimensional feature vector a first bucket identity (ID).
2. The method of clause 1, wherein assigning the first fixed-dimensional feature vector the first bucket ID further comprises:
   creating a new bucket ID for the first fixed-dimensional feature vector in response to a determination that the first pattern does not belong to one of a plurality of buckets corresponding to defect patterns.
3. The method of clause 1, wherein assigning the first fixed-dimensional feature vector the first bucket ID further comprises:
   mapping the first fixed-dimensional feature vector to the first bucket ID in response to a determination that the first pattern belongs to one of a plurality of buckets corresponding to defect patterns.
4. The method of clause 2 or clause 3, wherein the defect patterns comprise GDS information associated with defects.
5. The method of clause 4, wherein the defect patterns comprise information derived from the GDS information that includes number of sides, number of angles, dimension, shape, or a combination thereof.

6. The method of any one of clauses 1 to 3, wherein the fixed-dimensional feature vector is a one-dimensional feature vector.
7. The method of any one of clauses 1 to 3, wherein the trained model parameters are obtained by:
   obtaining a plurality of images of a plurality of patterns with assigned bucket IDs; and
   training model parameters for a deep learning network.
8. The method of clause 7, wherein the trained model parameters are further obtained by:
   applying parameters of a single polygon located in a center of one of a plurality of images for the deep learning network.
9. A method for pattern grouping, comprising:
   identifying a first feature in an acquired image of a sample;
   determining pattern data corresponding to the first feature;
   determining, by a classifier, a feature vector corresponding to the first feature; and
   determining a pattern group of the first feature based on the feature vector.
10. The method of clause 9, wherein the pattern data comprises a sample design plan.
11. The method of clause 9, wherein the classifier is a linear classifier, the method further comprising:
    training the linear classifier using a plurality of defect patterns having a plurality of vectors corresponding to defect features.
12. The method of clause 11, further comprising:
    retrieving the plurality of defect patterns from a storage.
13. The method of clause 11, further comprising:
    identifying a plurality of first features in the image; and
    determining pattern data corresponding to the plurality of first features,
    wherein the plurality of defect patterns comprise one or more of the first features.
14. The method of any of clauses 9 to 13, further comprising:
    converting the feature vector into a bucket ID; and
    classifying the first feature into the pattern group among a plurality of group based on the bucket ID.
15. The method of any of clauses 9 to 14, further comprising:
    when the feature vector of the first feature does not match any of feature vectors stored in a database, determining a new pattern group for the first feature.
16. The method of any of clauses 9 to 14, further comprising:
    when the feature vector of the first feature matches a feature vector stored in a database, adding the first feature to a group associated with the feature vector.
17. A system for pattern grouping, comprising:
    a charged particle beam apparatus including a detector;
    an image acquirer that includes circuitry to receive a detection signal from the detector and construct an image including a first feature; and
    a controller with at least one processor and a non-transitory computer readable medium comprising instructions that, when executed by the processor, cause the system to:
       determine pattern data corresponding to the first feature;
       determine, by a classifier, a feature vector corresponding to the first feature; and
       determine a pattern group of the first feature based on the feature vector.
18. The system of clause 17, wherein the pattern data comprises a sample design plan.
19. The system of clause 17, wherein the classifier is a linear classifier and the instructions further cause the system to:
    train the linear classifier using a plurality of defect patterns having a plurality of vectors corresponding to defect features.
20. The system of clause 19, wherein the plurality of defect patterns is retrieved from a storage.
21. The system of clause 19, wherein the instructions further cause the system to:
    identify a plurality of first features in the image; and
    determine pattern data corresponding to the plurality of first features,
    wherein the plurality of defect patterns comprise one or more of the first features.
22. The system of any of clauses 17 to 21, wherein the instructions further cause the system to:
    convert the feature vector into a bucket ID; and
    classify the first feature into the pattern group among a plurality of group based on the bucket ID.
23. The system of any of clauses 17 to 22, wherein the instructions further cause the system to:
    when the feature vector of the first feature does not match any of stored feature vectors in a database, determine a new pattern group for the first feature.
24. The system of any of clauses 17 to 22, wherein the instructions further cause the system to:
    when the feature vector of the first feature matches a stored feature vector in a database, add the first feature to a group associated with the stored feature vector.
25. A non-transitory computer readable medium storing a set of instructions that is executable by one or more processors of a system to cause the system to perform a method comprising:
    acquiring an image of a sample;
    identifying a first feature in the image;
    determining pattern data corresponding to the first feature;
    determining, by a linear classifier, a feature vector corresponding to the first feature; and
    determining a pattern group of the first feature based on the feature vector.
The computer-readable medium of clause 25, wherein the pattern data comprises a sample design plan.
26. The computer-readable medium of clause 25, wherein the set of instructions further cause the system to perform:
    training the linear classifier using a plurality of defect patterns having a plurality of vectors corresponding to defect features.
27. The computer-readable medium of clause 27, wherein the plurality of defect patterns is retrieved from a storage.
28. The computer-readable medium of clause 27, wherein the set of instructions further cause the system to perform:
    identifying a plurality of first features in the image; and
    determining pattern data corresponding to the plurality of first features,
    wherein the plurality of defect patterns comprise one or more of the first features.
29. The computer-readable medium of any of clauses 25 to 29, wherein the set of instructions further cause the system to perform:
    converting the feature vector into a bucket ID; and
    classifying the first feature into the pattern group among a plurality of group based on the bucket ID.
30. The computer-readable medium of any of clauses 25 to 30, wherein the set of instructions further cause the system to perform:

when the feature vector of the first feature does not match any of stored feature vectors in a database, determining a new pattern group for the first feature.

31. The computer-readable medium of any of clauses 25 to 30, wherein the set of instructions further cause the system to perform:
when the feature vector of the first feature matches a stored feature vector in a database, adding the first feature to a group associated with the stored feature vector.

32. A method for group mapping, comprising:
pre-training a linear classifier network based on Graphic Data System (GDS) of a sample, wherein the pre-training includes:
identifying a portion of the GDS that is associated with a region,
generating label data for the portion of the GDS that indicates a location of the region, and that indicates a type of shape of polygon data associated with the portion of the GDS, and
pre-training the linear classifier network based on the portion of the GDS and based on the label data;
receiving an image of a first pattern;
generating a first fixed-dimensional feature vector using trained model parameters, the model parameters being based on the received image; and
assigning the first fixed-dimensional feature vector a first bucket identity (ID).

33. The method of clause 33, wherein the location of the region is a central point of the region.

34. The method of clause 33, wherein the region is a cut out region.

35. The method of clause 33, wherein the GDS of the sample is the GDS of an integrated circuit to be manufactured on a wafer.

The block diagrams in the figures illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit. Blocks may also represent a module, a segment, or a portion of code that comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted. For example, in some embodiments, step S104 may be omitted. This may be because if sufficient training has already been performed, a classifier network may be used as-is without further training.

It should also be understood that each block of the block diagrams, and combination of the blocks, may be implemented by special purpose hardware-based systems that perform the specified functions or acts, or by combinations of special purpose hardware and computer instructions. While the present invention has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for group mapping, comprising:
receiving an image of a first pattern;
generating a first fixed-dimensional feature vector using trained model parameters, the model parameters being based on the received image; and
assigning the first fixed-dimensional feature vector a first bucket identity (ID).

2. The method of claim 1, wherein assigning the first fixed-dimensional feature vector the first bucket ID further comprises:
creating a new bucket ID for the first fixed-dimensional feature vector in response to a determination that the first pattern does not belong to one of a plurality of buckets corresponding to defect patterns.

3. The method of claim 1, wherein assigning the first fixed-dimensional feature vector the first bucket ID further comprises:
mapping the first fixed-dimensional feature vector to the first bucket ID in response to a determination that the first pattern belongs to one of a plurality of buckets corresponding to defect patterns.

4. The method of claim 2, wherein the defect patterns comprise GDS information associated with defects.

5. The method of claim 4, wherein the defect patterns comprise information derived from the GDS information that includes number of sides, number of angles, dimension, shape, or a combination thereof.

6. The method of claim 1, wherein the fixed-dimensional feature vector is a one-dimensional feature vector.

7. The method of claim 1, wherein the trained model parameters are obtained by:
obtaining a plurality of images of a plurality of patterns with assigned bucket IDs; and
training model parameters for a deep learning network.

8. The method of claim 7, wherein the trained model parameters are further obtained by:
applying parameters of a single polygon located in a center of one of a plurality of images for the deep learning network.

9. The method of claim 1, further comprising:
pre-training a linear classifier network based on Graphic Data System (GDS) of a sample.

10. The method of claim 9, wherein the pre-training of the linear classifier network includes:
identifying a portion of the GDS that is associated with a region,
generating label data for the portion of the GDS that indicates a location of the region, and that indicates a type of shape of polygon data associated with the portion of the GDS, and
pre-training the linear classifier network based on the portion of the GDS and based on the label data.

11. A system for pattern grouping, comprising:
a charged particle beam apparatus including a detector;
an image acquirer that includes circuitry to receive a detection signal from the detector and construct an image including a first feature; and
a controller with at least one processor and a non-transitory computer readable medium comprising instructions that, when executed by the processor, cause the system to:
determine pattern data corresponding to the first feature;

determine, by a classifier, a feature vector corresponding to the first feature; and
determine a pattern group of the first feature based on the feature vector.

12. The system of claim 11, wherein the pattern data comprises a sample design plan.

13. The system of claim 11, wherein the classifier is a linear classifier and the instructions further cause the system to:
train the linear classifier using a plurality of defect patterns having a plurality of vectors corresponding to defect features.

14. The system of claim 13, wherein the plurality of defect patterns is retrieved from a storage.

15. A non-transitory computer readable medium storing a set of instructions that is executable by one or more processors of a system to cause the system to perform a method comprising:
acquiring an image of a sample;
identifying a first feature in the image;
determining pattern data corresponding to the first feature;
determining, by a linear classifier, a feature vector corresponding to the first feature; and
determining a pattern group of the first feature based on the feature vector.

16. The method of claim 1, further comprising:
generating a plurality of fixed-dimensional feature vectors that represent the received image; and
for each of a plurality of patterns included in the received image, assigning a bucket ID based on the plurality of fixed-dimensional feature vectors.

17. The system of claim 11, wherein the non-transitory computer readable medium comprises instructions that, when executed by the processor, cause the system to:
generate a plurality of fixed-dimensional feature vectors that represent the received image; and
for each of a plurality of patterns included in the received image, assign a bucket ID based on the plurality of fixed-dimensional feature vectors.

18. The non-transitory computer readable medium of claim 15, wherein the set of instructions are executable by one or more processors of a system to cause the system to perform:
generating a plurality of fixed-dimensional feature vectors that represent the received image; and
for each of a plurality of patterns included in the received image, assigning a bucket ID based on the plurality of fixed-dimensional feature vectors.

* * * * *